US006459730B1

United States Patent
Samueli et al.

(10) Patent No.: US 6,459,730 B1
(45) Date of Patent: Oct. 1, 2002

(54) APPARATUS FOR, AND METHOD OF, PROCESSING SIGNALS TRANSMITTED OVER A LOCAL AREA NETWORK

(75) Inventors: Henry Samueli, Northridge; Fang Lu, Irvine; Avanindra Madisetti, Torrance, all of CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/482,699

(22) Filed: Jan. 13, 2000

Related U.S. Application Data

(63) Continuation of application No. 08/970,557, filed on Nov. 14, 1997, now Pat. No. 6,178,198.

(51) Int. Cl.$^7$ .............................................. H04L 27/01
(52) U.S. Cl. ...................................... 375/233; 375/350
(58) Field of Search ................................. 375/216, 232, 375/233, 348, 350; 708/323

(56) References Cited

U.S. PATENT DOCUMENTS

| | | | |
|---|---|---|---|
| 3,962,637 A | | 6/1976 | Motley et al. ................. 375/42 |
| 4,597,089 A | | 6/1986 | Motley et al. ................. 375/13 |
| 4,599,732 A | | 7/1986 | LeFever ....................... 375/13 |
| 4,864,590 A | | 9/1989 | Arnon et al. .................. 375/14 |
| 5,003,555 A | | 3/1991 | Bergmans ..................... 375/12 |
| 5,031,194 A | * | 7/1991 | Crespo et al. ............... 375/230 |
| 5,065,412 A | | 11/1991 | Schenk ........................ 375/111 |
| 5,230,012 A | | 7/1993 | Schenk ........................ 375/111 |
| 5,276,711 A | | 1/1994 | Rossi ........................... 375/106 |
| 5,444,712 A | | 8/1995 | Betts et al. ............... 370/110.1 |
| 5,559,840 A | | 9/1996 | Melas et al. ................. 375/355 |
| 5,604,741 A | | 2/1997 | Samueli et al. .............. 370/402 |
| 5,617,450 A | * | 4/1997 | Kakuishi et al. ............. 375/230 |
| 5,638,409 A | * | 6/1997 | Awata et al. ................. 375/355 |
| 5,724,397 A | * | 3/1998 | Torsti .......................... 375/355 |
| 5,748,674 A | * | 5/1998 | Lim ............................ 375/233 |

OTHER PUBLICATIONS

Joshi, Robindra B. et al., "WP 4.2: A 100 MHz, 5MBaud QAM Decision–Feedback Equalizer for Digital Television Applications" 1994 IEEE International Solid–State Circuits Conference, ISSCC94/Session 4/Video and Communication Signal Processors/Paper WP 4.2 pp. 68–69.

Martin, James et al., "Local Area Networks Architectures and Implementations" Second Edition, 1994, pp. 167–170, 204.

Razavi, James et al., "Monolithic Phase–Locked Loops and Clock Recovery Circuits" IEEE Press, 1996, Tutorial pp. 2–7.

Anderson, John B., "Digital Transmission Engineering" IEEE Press, 1999, Synchronization—Chapter 4, pp. 193–199.

* cited by examiner

*Primary Examiner*—Amanda T. Le
(74) *Attorney, Agent, or Firm*—McAndrews, Held & Malloy, Ltd.

(57) ABSTRACT

Digital signals provided by a repeater connected to a plurality of clients by unshielded twisted wire pairs, are converted to analog signals which become degraded during transmission through the wires. Clients convert the degraded analog signals to digital signals. Digital signal phases are coarsely adjusted to have assumed zero crossing times coincide in-time with a clock signal zero crossing. Signal polarity, and the polarity of any change, is determined at the assumed zero crossing times of the digital signals. Precursor and post-cursor responses, resulting from signal degradation, are respectively inhibited by a feed forward and a decision feedback equalizer. The time duration of post-cursor response is further inhibited by a high pass filter and a tail canceller. Phase adjustments are made, after response inhibition, by determining the polarity, and the polarity of any change, at the assumed zero crossing times. Before phase adjustments are made, a phase offset is provided in order to compensate for phase degradations introduced by the unshielded twisted wire pairs.

12 Claims, 6 Drawing Sheets

APPARATUS FOR, AND METHOD OF, PROCESSING SIGNALS TRANSMITTED OVER A LOCAL AREA NETWORK

CROSS-REFERENCE TO RELATED APPLICATIONS

This application is a continuation of patent application Ser. No. 08/970,557, filed Nov. 14, 1997, now U.S. Pat. No. 6,178,198, the contents of which are expressly incorporated herein by reference.

This invention relates to systems for, and methods of, providing for the transmission and reception of signals through unshielded twisted pairs of wires between a repeater and a plurality of clients. The invention particularly relates to systems for, and methods of, using digital techniques for enhancing the recovery, and the quality of such recovery, of the analog signals passing through the unshielded twisted pairs of wires to the client so that the information represented by such analog signals will be accurately recovered at the client.

BACKGROUND OF THE INVENTION

In a hub-and-spoke network topology, a repeater resides on a hub. The repeater facilitates an exchange of data packets among a number of clients. A client can be a computer, a facsimile machine, another computer, etc. The repeater serves several ports where each port is connected to an individual one of the clients with a separate point-to-point link between the repeater and such client.

In a 100BASE-TX signalling protocol, unshielded twisted pairs of wires constitute the point-to-point link between the repeater and each of the clients. Each link consists of two pairs of unshielded twisted wires. One pair of the unshielded twisted wires provides for a transmission of data from the repeater to an individual one of the clients. The other pair of the unshielded twisted wires provides for a transmission of data from the individual one of the clients to the repeater.

When information is illustratively transmitted from the repeater to an individual one of the clients in a 100BASE-TX system, the information is originally in digital form. The digital information may represent individual ones of a plurality of analog levels. Specifically, in a 100BASE-TX System, the digital signals may represent analog levels of +1, 0 and −1.

The digital information at the repeater may be converted to analog form and then transmitted in analog form through the unshielded twisted pair of wires to the individual one of the clients. The transmitted signals are received in analog form at the individual one of the clients. The received signals are then processed to recover the transmitted information represented by the analog information.

The distance between the repeater and the individual one of the clients may be as great as one hundred meters. The unshielded twisted pair of wires coupling the repeater and the individual one of the clients produces a degradation in the characteristics of the signals as the signals pass through the unshielded twisted pair of wires. The amount of the degradation rapidly increases with increases in the length of the unshielded twisted pair of wires connected between the repeater and the individual one of the clients.

The degradation results in part from Inter Symbol Interference (ISI), signal attenuation, crosstalk, clock jitter and a number of other factors. Such degradation severely distorts the transmitted data signals. The degradation also results in part from the fact that the analog information transmitted from the repeater to the individual one of the clients is also received at the other clients connected to the repeater and is reflected back to the repeater, thereby affecting the characteristics of the signals transmitted from the repeater to the individual one of the clients.

Analog techniques have been used in the prior art to process the analog signals received at the individual one of the clients. These analog techniques have not been completely effective in eliminating the degradation or distortions in the signals received at the individual one of the clients. This has caused errors to be produced in the information received and processed at the individual one of the clients. This has been true even though the 100BASE-TX system provides substantially greater noise immunity than other types of systems and is able to handle smaller signal levels than other types of systems.

BRIEF DESCRIPTION OF THE INVENTION

This invention relates to a system for, and method of, converting analog signals received at a client from a repeater to corresponding digital signals. The digital signals are processed to shift the times for the production of the digital signals so that the digital signals are produced at the zero crossings of clock signals having a particular frequency. The digital signals are also processed to determine at each instant the magnitude of the digital signals closest to the magnitude representing individual ones of a plurality of amplitude levels such as +1, 0 and −1 and to then convert such magnitude to such closest one of such amplitude levels. In this way, the information represented by the transmitted signals is accurately recovered at the client.

In one embodiment of the invention, digital signals provided by a repeater connected as by unshielded twisted pairs of wires to a plurality of clients are converted to analog signals. The analog signals become degraded during transmission through the wires. At the client, the degraded analog signals are converted to digital signals. Initially, the phases of the digital signals are coarsely adjusted to have the times assumed for a zero crossing of the digital signals coincide in time with the zero crossing of a clock signal. This phase adjustment is made by determining the polarity, and the polarity of any change, in the digital signals at the time assumed to be the zero crossings of the digital signal.

Subsequently the pre-cursor and post-cursor responses (resulting from the signal degradations) in the digital signals are respectively inhibited by a feed forward equalizer and a decision feedback equalizer. A high pass filter and a tail canceller also inhibit the post-cursor response of the digital signals by limiting the time duration of the post-cursor response.

Phase adjustments are made in the resultant digital signals, after the inhibition in the pre-cursor and post-cursor responses, by determining the polarity, and the polarity of any change, in the digital signals at the times assumed to be the zero crossings of the digital signals. However, before any phase adjustments are made, a phase offset is provided in the digital signals to compensate for phase degradations produced in the signals passing through the unshielded twisted pairs of wires.

Although the invention is discussed in this application with reference to the 100BASE-TX system, it will be appreciated that the invention is not limited to the 100BASE-TX system. For example, the invention is applicable to any 100BASE-TX system. The invention is also applicable to other systems.

DETAILED DESCRIPTION OF THE INVENTION

The discussion in this specification may be considered to relate specifically to a 100BASE-TX system for the purposes of explanation and understanding of the invention. However, it will be understood that the concepts of this invention and the scope of the claims apply to other types of systems than the 100BASE-TX system. For example, the concept of this invention and the scope of the claims apply to any 100BASE-TX system. For example, the concepts of the invention and the scope of the claims also apply to other systems than 100BASE-TX systems.

Figure 1:
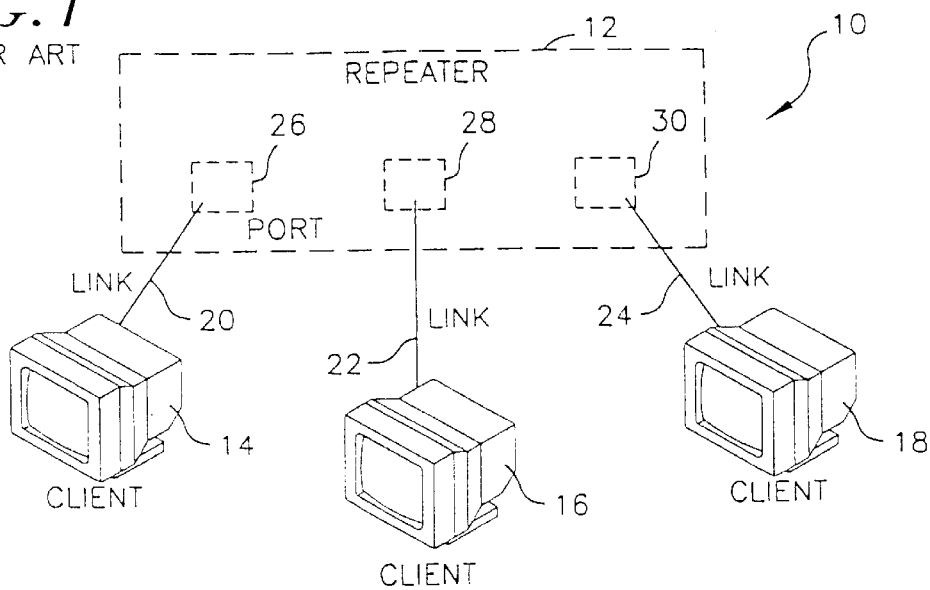
FIG. 1 is a schematic diagram, primarily in block form, of a system known in the prior art and including a repeater, a plurality of clients and a plurality of links (e.g., unshielded twisted pairs of wires) each connected between the repeater and an individual one of the clients.

FIG. 1 illustrates a system, generally indicated at 10, of the prior art. The system includes a repeater 12 and a plurality of clients 14, 16 and 18. The repeater 12 facilitates the exchange of data packets between the repeater and the clients 14, 16 and 18 and among the clients. Each of the clients 14, 16 and 18 may be a computer, a facsimile machine, another repeater or a number of other different types of equipment. The clients 14, 16 and 18 may be respectively connected to the repeater 12 as by cable or links 20, 22 and 24. The cables or links 20, 22 and 24 may be respectively connected to ports 26, 28 and 30 in the repeater 12.

Although the following discussion relates to the transfer of information from the repeater 12 to individual ones of the clients 14, 16 and 18, it will be appreciated that the information transfer may be from individual ones of the clients 14, 16 and 18 to the repeater 12 without departing from the scope of the invention. Furthermore, a different number of clients than three (3) may be connected to the repeater 12 without departing from the scope of the invention.

The cables or links 20, 22 and 24 may constitute pairs of unshielded twisted wires. Two pairs of such wires may be provided between the repeater 12 and each individual one of the clients 14, 16 and 18. One pair of such wires provides for a transmission of information from the repeater 12 to the individual one of the clients 14, 16 and 18. The other pair of such wires provides for the transmission of information from the individual one of the clients 14, 16 and 18 to the repeater 12.

In the prior art, each of the links 14, 16 and 18 severely distorts the transmitted data packets. The amount of the degradation rapidly increases with increases in the length of the link. The degradation results from Inter Symbol Interference (ISI), signal attenuation, crosstalk, clock jitter, etc. Therefore, an adaptor is provided to couple data reliably to and from the link. The adaptor provides the interface to a computer on one side (e.g., ISA, EISA, PCI, etc.) of the adaptor and to the links such as the link 20 on the other side of the adaptor. It can also include circuitry such as a transducer to transmit data to, and receive data from, a link such as the links 14, 16 and 18.

Figure 2:
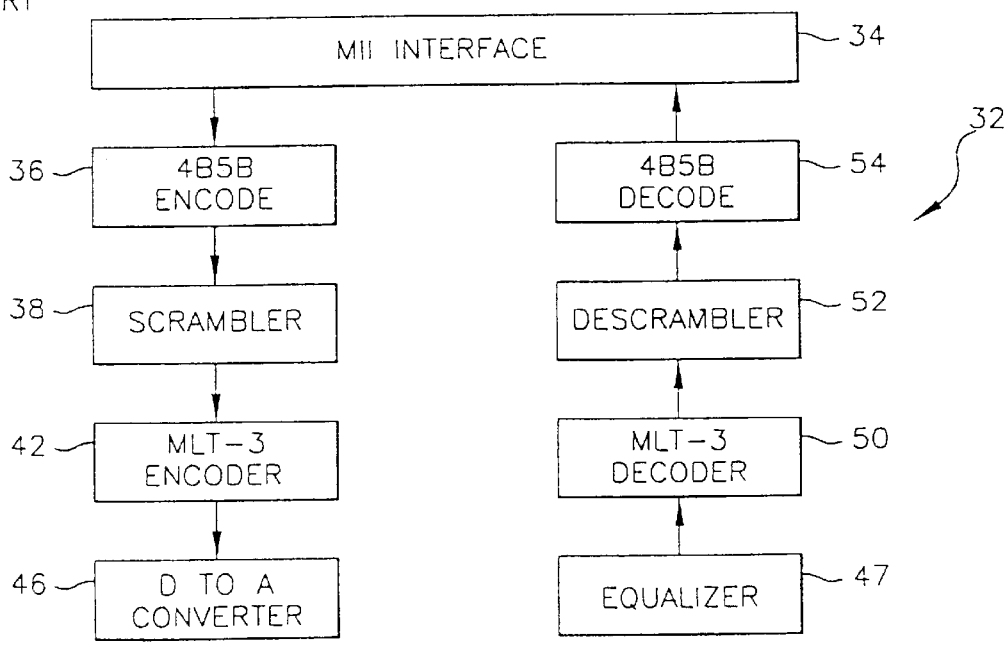
FIG. 2 is a schematic diagram, primarily in block form, of a system known in the prior art for encoding information in digital form at the repeater, converting the digital information to analog information at the repeater, transmitting the analog information to a client, converting the analog information to digital information at the client and decoding the digital information at the client to recover the transmitted information.

A transceiver generally indicated at 32 is shown in FIG. 2 and is known in the prior art with respect to most of the blocks shown in FIG. 2. The transceiver 32 includes a standard connector designated as a Media Independent Interface (MII) 34. The Media Independent Interface 34 may be a four (4)-bit wide data path in both the transmit and receive directions. Clocked at a suitable frequency such as 25 MHz, it results in a net throughput in both directions of data at a suitable rate such as 100 Mb/sec. It provides a symmetrical interface in both the transmit and receive directions and may have a total of forty (40) clock, data and control pins.

The input data passes through the Media Independent Interface 34 in FIG. 2 to a 4B5B Encoder 36. The input data is grouped into nibbles (or groups of four (4) bits each).

Each 4-bit nibble is then encoded to produce a five (5)-bit symbol. The 4B5B encoding was originally provided to (1) maintain dc balanced codes—in other words, equal numbers of 1's and 0's, (2) introduce redundancy so that control information can be distinguished from data, and (3) provide sufficient transitions to facilitate clock recovery. A consequence of 4B5B encoding is that the data rate increases to a suitable rate such as 125 Mb/sec. and the coding efficiency is reduced to eighty percent (80%) because of this increase in data rate without a corresponding increase in the amount of data processed.

The 5B encoded symbols from the encoder 36 are introduced to a scrambler 38 in FIG. 2. The 5B encoded symbols are scrambled to ensure that the transmitted spectrum complies with the Federal Communications Commission (FCC) mandates on EMI. The scrambler 38 may be a maximal-length Pseudo Noise (PN) sequence generator with a period of 2047 bits. It is generated by an 11-b linear feedback shift register (LFSR). The output bits from the scrambler 38 are generated recursively as $X(n)=X(n-11)+X(n-9)$. The pseudo-random bit stream produced by the scrambler 38 is exclusive-or'd with the transmit datastream. Scrambling destroys the dc balance and transition properties of the 5B codes.

Figure 3:
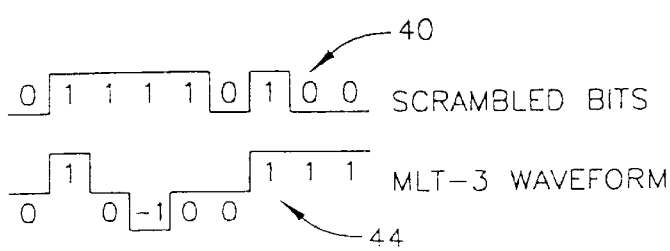
FIG. 3 is a schematic diagram showing how digital bits of information are scrambled at the receiver in the prior art and how the scrambled bits are encoded at the repeater to a sequence of bits having a plurality of amplitude levels such as +1, 0, and −1.

The scrambled bits are indicated schematically at 40 in FIG. 3. The scrambled bits 40 are encoded by an MLT-3 encoder 42 to produce bits indicated at 44 in FIG. 3. The scrambled bits 40 provide a binary 1 when a transition is to be made in the amplitude level between symbol values of +1, 0 and −1. If a scrambled bit is a 0, the amplitude level of the previous bit in the sequence 44 is retained. By controlling the transitions (not allowing a direct transition between states +1 and −1), MLT-3 signalling limits the maximum frequency to 31.25 MHz (Nyquist frequency is 62.5 MHz).

The signals from the MLT-3 encoder 42 are introduced to a digital-to-analog converter 46 and the resultant analog signals are passed through one of the links such as the link 20 in FIG. 1. The signals at the other end of the link such as the link 20 are then processed by an analog equalizer 47 and the resultant signals are introduced to an MLT-3 decoder 50. The MLT-3 decoder operates to decode the signals previously encoded by the MLT-3 encoder 42. The decoded signals then pass to a descrambler 52 which operates to descramble the signals previously scrambled by the scrambler 38. A 4B5B decoder then operates to decode to four (4) bits the five (5) bit encoding provided by the encoder 36. The signals in the four (4) bit format then pass to the Media Independent Interface 34.

Figure 4:
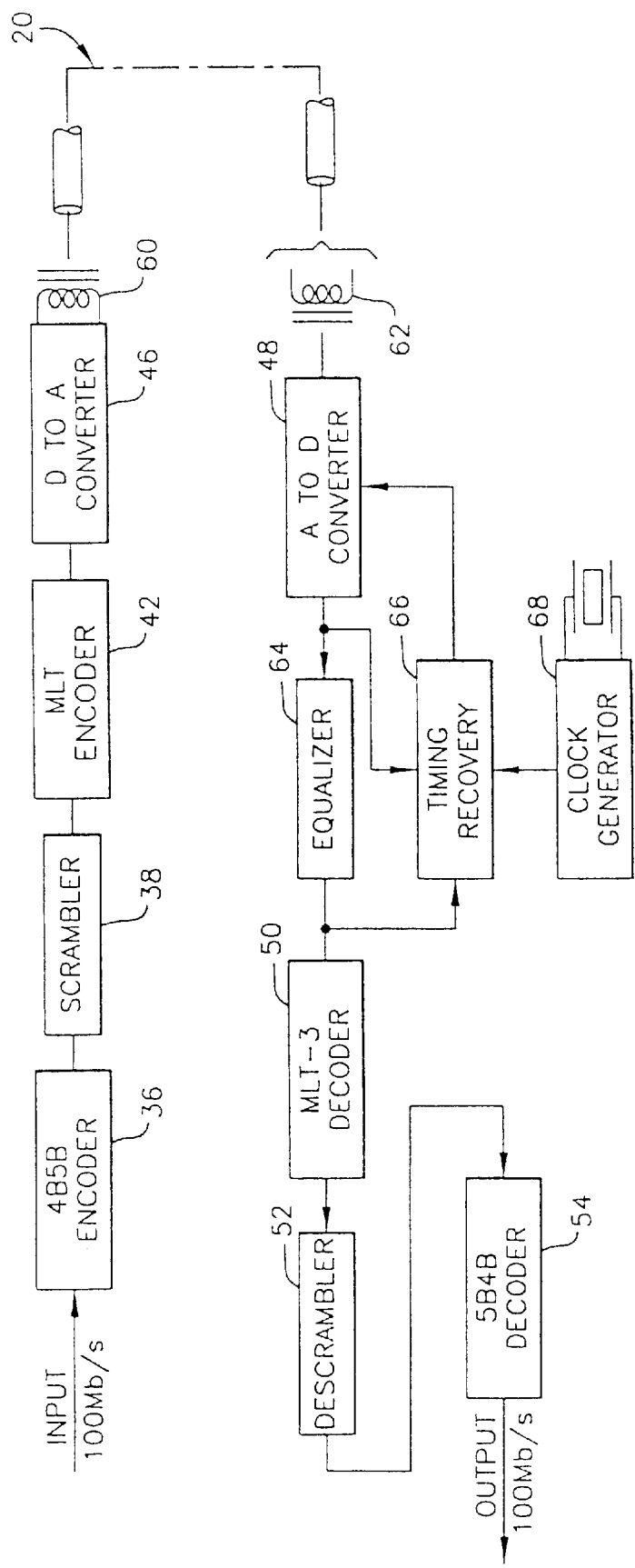
FIG. 4 is a circuit diagram, primarily in block form, of a system known in the prior art for encoding information in digital form and transmitting the information in an analog form to a client and of a system included as one embodiment of the invention for digitally processing the analog signals received at the client to recover the encoded information.

The signals passing through the link such as the link 14 in FIG. 1 have not been converted in the prior art to the digital form such as provided as at 48 in FIG. 4 in the embodiment of this invention. Instead, the signals passing through the link such as the link 20 have been processed in the prior art in the analog form. This has prevented the distortions produced in the links such as the link 20 from being eliminated to the extent that they are eliminated when the signals are processed in the digital form as in the embodiment of this invention. Furthermore, as will be seen from the subsequent discussions, applicants use individual techniques in this invention to process the signals in the digital form. These individual techniques have not been provided in the prior art. These individual techniques cause the information represented by the digital signals to be recovered with an enhanced accuracy relative to that obtained in the prior art.

FIG. 4 illustrates a circuit diagram, primarily in block form, of applicants' invention when incorporated in the prior art system shown in FIG. 2. In FIG. 4, the blocks common to the blocks shown in FIG. 2 are given the same numerical designations as the corresponding blocks shown in FIG. 2. However, additional blocks are shown in FIG. 4 and these are given individual identifications in FIG. 4. These include a transformer 60 between the digital-to-analog converter 46 and the link 20 and a transformer 62 between the link 20 and the analog-to-digital converter 48.

A block generally indicated at 64 and generically designated as an equalizer receives the output of the analog-to-digital converter 48 in FIG. 4. The equalizer 64 is shown in detail in FIG. 5 and will be described in detail subsequently. The digital signals from the analog-to-digital converter 48 are also introduced to a timing recovery stage 66, the output of which passes to the analog-to-digital converter 48 to control the operation of the converter. The operation of the timing recovery stage 66 is controlled by a clock signal generator 68 which generates clock signals at a particular frequency such as approximately 125 MHz. The operation of the clock signal generator 68 may be crystal controlled as at 70. In addition to receiving inputs from the analog-to-digital converter 48, the timing recovery stage 66 receives as an input the output from the equalizer 64. The output of the equalizer 64 also passes to the MLT-3 decoder 50 also shown in FIG. 2.

As previously indicated, the MLT-3 encoder 42 provides digital signals at a suitable frequency such as approximately 125 MHz. These signals are converted to analog signals by the converter 46. After being introduced to the transformer 60, the analog signals are passed through the link such as the link 20 to the transformer 62, which introduces the signals to the analog-to-digital converter 48.

Figure 9:
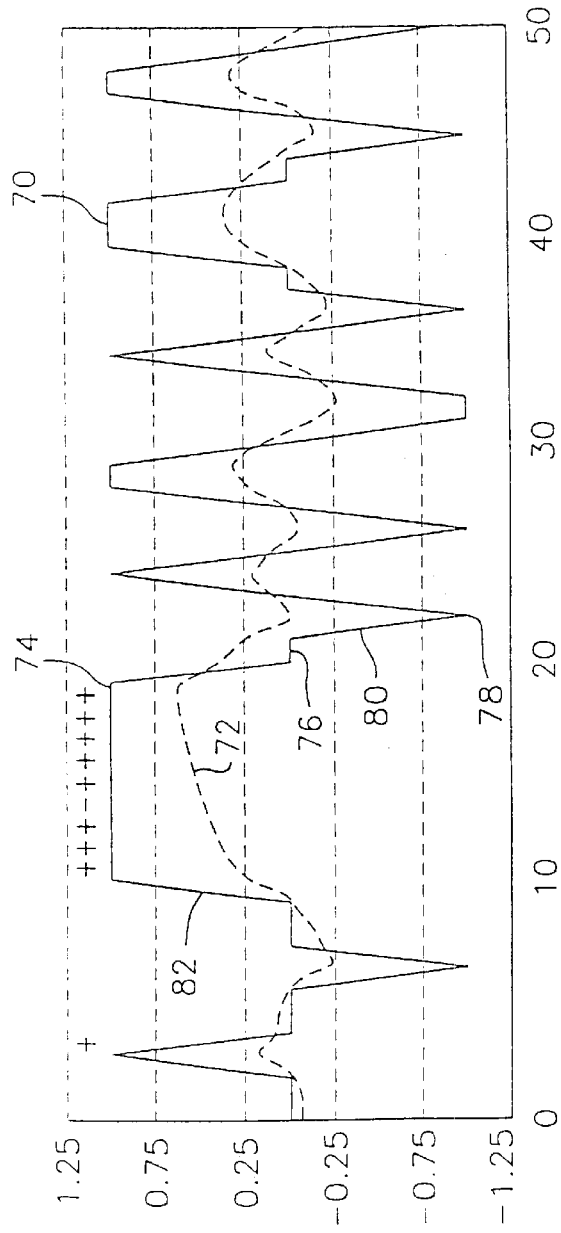
FIG. 9 shows curve illustrating the pattern of digital signals encoded at the repeater at the different amplitude levels such as +1, 0 and −1 and the pattern of the analog signals received at the client as a result of such encoding at the repeater.

FIG. 9 illustrates at 70 the signals produced by the MLT encoder 42. As will be seen, the signals from the encoder 42 have at each instant one of three (3) amplitude levels such as +1, 0 and −1 to represent information. FIG. 9 also illustrates at 72 the signals received at the analog-to-digital converter 48. As will be seen, there is a considerable degradation or distortion of the signals 72 relative to the signals 70. This degradation is produced in the link 20 and is also produced because of the interference provided by the signals in the links 22 and 24.

It is desirable for the converter 48 to sample the analog signals at the zero crossing and peak amplitude of the waveform 70. In this way, the converter 48 will provide an indication of the amplitude level of the encoded signals from the encoder 42. For example, if the converter 48 samples the analog signals in FIG. 9 at the times indicated at 74, 76 and 78, the converter will produce digital signals respectively representing the analog levels +1, 0 and −1. However, if the converter 48 samples the signals at a time indicated at 80 or at a time indicated at 82, the converter will produce digital signals which may not represent the proper one of the analog levels +1, 0 and −1. This may cause errors to be produced in the reproduction of the information represented by the digital signals produced by the converter 48.

The timing recovery stage 66 in FIG. 4 operates at a suitable frequency such as approximately 125 MHz to produce digital signals having amplitudes corresponding to the magnitudes of the analog signals 72 in FIG. 9 at the instants of conversion. The timing recovery stage 66 operates to adjust the times that the digital signals are produced by the converter 48 so that these signals occur at the zero crossings and the peak amplitudes of the waveform 70. In this way, the digital signals will be produced by the converter 48 at times such as the times 74, 76 and 78 in FIG. 9 rather than at times such as the times 80 and 82 in FIG. 9.

Figure 10:
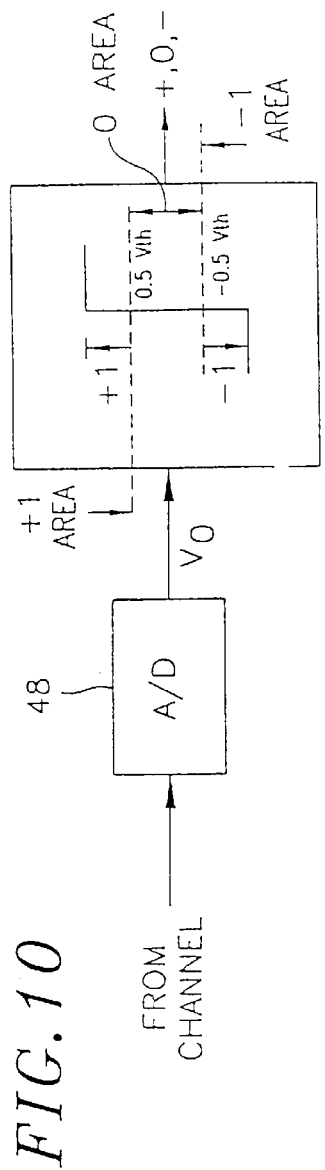
FIG. 10 illustrates the adaptive thresholds for controlling whether the digital signals produced at each instant at the client represent individual ones of a plurality of amplitude levels such as +1, 0 and −1.

FIG. 10 illustrates how the timing recovery stage 66 initially operates to determine whether each digital conversion has an amplitude level representing +1, 0 or −1. For an analog voltage between −0.5 volts and +0.5 volts, the amplitude level of the digital conversion of this analog voltage is initially assumed to be 0. For an analog voltage with a positive value greater than +0.5 volts, the amplitude level of the digital conversion of the analog voltage initially is assumed to be +1. When the analog voltage has a negative value with an absolute magnitude greater than 0.5 volts, the amplitude level of the digital conversion of the analog voltage is initially assumed to be −1. These assumptions are made because of the considerable distortion in the characteristics of the signals 72 (FIG. 9) introduced to the converter 48 relative to the characteristics of the signals 70 produced by the encoder 42.

Figure 11:
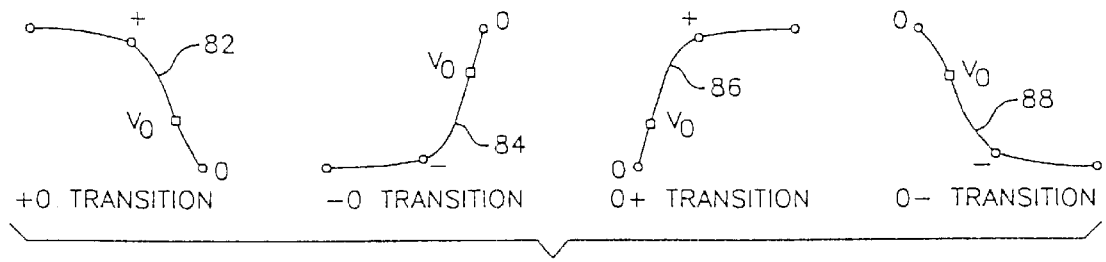
FIG. 11 shows different timing relationships between (a) a voltage assumed at the client to be at a zero crossing in the production of digital signals at the client and (b) a zero crossing of a clock signal at a particular frequency, these timing relationships being used to adjust the time at which the voltage is assumed to be at the zero crossing.

FIG. 11 indicates how phase adjustments are initially made for different operating conditions to have the time assumed by the converter 48 for the zero crossing of the digital voltage $V_o$ coincide in time with the time for the zero crossing of the clock signals from the clock generator 68. FIG. 11 indicates four (4) different conditions in which phase adjustments are made in the time assumed by the converter 48 for the zero crossing of the digital voltage. For each of these four (4) conditions, the indication "0" represents the time at which the clock signal from the clock signal generator 68 crosses the zero line. Furthermore, for each of these four (4) operating conditions, $V_o$ indicates the voltage which is actually produced by the analog-to-digital converter 48 at the time assumed by the converter to constitute the time at which a zero crossing occurs.

As will be seen in FIG. 4, the digital signals from the analog-to-digital converter 48 are shown as being introduced directly to the timing recovery stage 66. This occurs before the equalizer 64 becomes operative to determine whether each of the digital signals from the converter 48 has an amplitude level of +1, 0, or −1. The digital signals from the converter 48 are initially processed by the timing recovery stage 66 because no significant information is obtained from the operation of the equalizer 64 until a coarse adjustment has been provided by the timing recovery stage in the times for the production of the voltage $V_o$.

The first condition in FIG. 11 is designated as "+0 transition." In this condition, the voltage $V_o$ is positive as indicated by a "+" sign above and to the left of the "$V_o$" designation. Furthermore, the $V_o$ voltage occurs before the "0" voltage indicating the time at which the clock signals from the generator 68 cross the zero line. As shown in the curve at the left in FIG. 11, the voltage decreases from $V_o$ to the "0" line crossing. Under such conditions, the time for the production of the digital signals by the converter 48 would be moved to the right—or, from a time standpoint, delayed—in FIG. 11 to have the $V_o$ indication coincide in time with the "0" indication.

If the $V_o$ voltage should be negative with the same shape of curve as shown in the "0−" transition in FIG. 11, the $V_o$ voltage would be below and to the right of the "0" indication. Under such circumstances, the time for the production of the digital signals by the converter 48 would be moved to the left—or, from a time standpoint, advanced—in FIG. 11 to have $V_o$ coincide in time with the "0" indication.

The condition second from the left in FIG. 11 is designated as "−0 transition." In that condition, $V_o$ is below the "0" indication from a voltage standpoint and occurs to the left—or, from a time standpoint, before—the "0" indication. Furthermore, the $V_o$ voltage is negative as indicated by a "−" sign to the left and below the "0" and "$V_o$" indications. Under such circumstances, the voltage $V_o$ is moved to the right—or, from a time standpoint, delayed—to have the $V_o$ indication coincide in time with the "0" indication.

If the $V_o$ indication should be positive with the same shape of curve as shown in the "−0" transition in FIG. 11, the $V_o$ voltage would be above and to the right of the "0" indication. Under such circumstances, the production of the voltage $V_o$ would be moved to the left by the converter 48—or, from a time standpoint, advanced—in FIG. 11 to have $V_o$ coincide in time with the "0" indication.

The third condition in FIG. 11 is designated as a "0+" transition. In that condition, the "0" indication is below and to the left—or, from a time standpoint, before—the $V_o$ indication. In other words, $V_o$ is positive relative to the "0" indication. This is indicated by a "+" sign above and to the right of the $V_o$ indication. Under such circumstances, the production of the $V_o$ indication would be moved to the left—or, from a time standpoint, advanced—in FIG. 11 to have $V_o$ coincide in time with the "0" indication.

If the $V_o$ indication should be negative with the same shape of curve as shown in the "0+" transition in FIG. 11, the $V_o$ voltage would be below and to the left of the "0" indication. Under such circumstances, the time for the production of the digital signals by the converter 48 would be moved to the right—or, from a time standpoint, delayed—in FIG. 11 to have $V_o$ coincide in time with the "0" indication.

The fourth condition in FIG. 11 is designated as a "0−" transition. In that condition, the "0" indication is above and to the left—or, from a time standpoint, before—the $V_o$ indication. In other words, $V_o$ is negative relative to the "0" indication. This is indicated by a "−" sign below and to the right of the $V_o$ indication. Under such circumstances, the timing of the $V_o$ indication would be moved to the left—or, from a time standpoint, advanced—in FIG. 11 to have $V_o$ coincide in time with the "0" indication.

If the $V_o$ indication should be positive with the same shape of curve as shown in the "0−" transition in FIG. 11, the $V_o$ voltage should be above and to the left of the "0" indication. Under such circumstances, the production of the digital signals by the converter would be moved to the right—or, from a time standpoint, delayed—in FIG. 11 to have $V_o$ coincide in time with the "0" indication.

Figure 5:
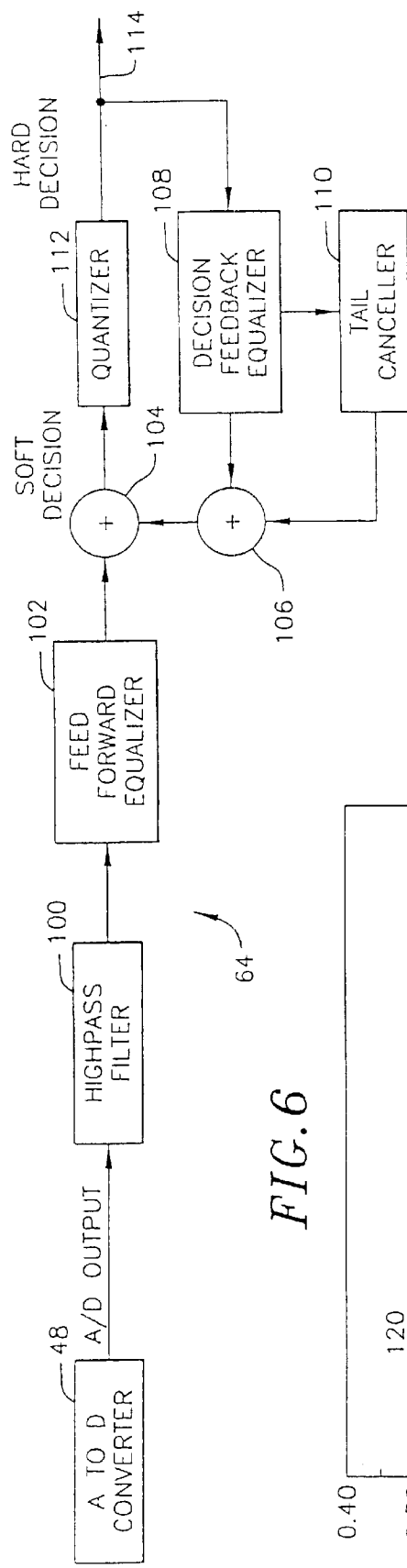
FIG. 5 is a circuit diagram, primarily in block form, of a system, including equalizers, for inclusion in the embodiment shown in FIG. 4 to process digitally the analog signals received at the client and to produce signals representative of individual ones of the plurality of amplitude levels such as +1, 0 and −1.

After the time of the $V_o$ indication has been adjusted; as shown in FIG. 11 and discussed above, to have it coincide in time with the "0" indication, the digital signals from the analog-to-digital converter 48 are introduced to the equalizer 64 in FIG. 4. The equalizer 64 is shown in detail in FIG. 5. In FIG. 5, the signals from the analog-to-digital converter 48 are introduced to a high pass filter 100. The signals from the high pass filter 100 in turn pass to a feed forward equalizer 102. A feed forward equalizer such as the equalizer 100 is known in the prior art. The signals from the feed forward equalizer 102 are introduced to an adder 104 which also receives signals from an adder 106.

The adder 106 receives the outputs from a decision feedback equalizer 108 and from a tail canceller 110. A decision feedback analyzer such as the equalizer 100 is known in the prior art. The signals from the decision feedback equalizer 108 are also introduced to the tail canceller 110. Signals are introduced to the decision feedback equalizer 108 from a quantizer 112. The quantizer 112 receives the output from the adder 104. The quantizer 112 (also known as a slicer) is known in the art.

Figure 7:
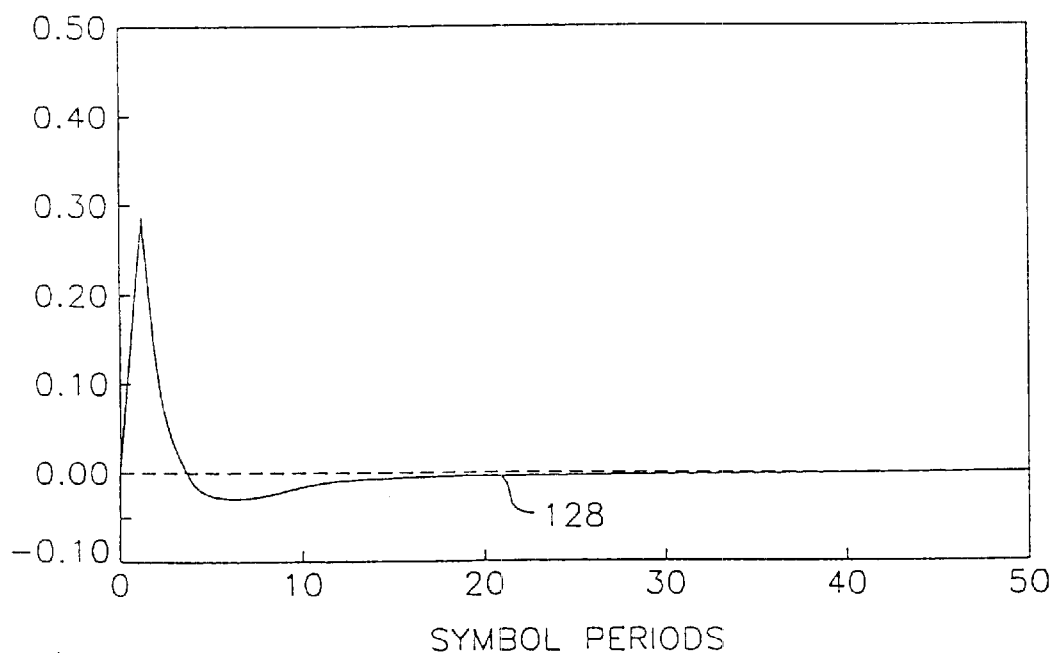
FIG. 7 is a curve similar to that shown in FIG. 6 and illustrates the response of the system after an operation of a high pass filter included in the embodiment shown in FIG. 5 in limiting the length of a tail in the cable response shown in FIG. 6.

A feed forward equalizer, a decision feedback equalizer and a slicer are shown in FIG. 7 and are disclosed in U.S. Pat. No. 5,604,741, issued to Henry Samueli, Mark Berman and Fan Lu on Feb. 18, 1997, for an "Ethernet System" and assigned of record to the assignee of record of this application. Reference is made to U.S. Pat. No. 5,604,741 if any additional disclosure is necessary to complete the disclosure of the feed forward equalizer 102, the decision feedback equalizer 108, the quantizer 112 and the adder 104 in this application.

Figure 6:
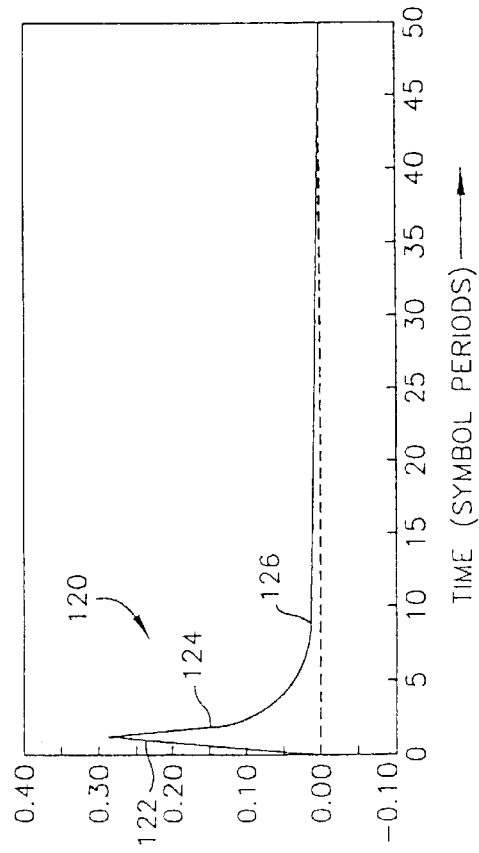
FIG. 6 is a curve schematically illustrating the pulse response of a link (e.g. unshielded twisted pairs of wires) connected between the repeater and the client in the system shown in FIGS. 4 and 5.

As will be seen in FIG. 6, a composite signal generally indicated at 120 is shown as being comprised of a left portion 122 and a right portion 124. Each of the portions 122 and 124 has distortions. The distortions in the left portion 122 may be considered as a pre-cursor response. The distortions in the right portion 124 may be considered as a post-cursor response. The distortions result in part from the fact that the digital signals representing information or data develop tails as they travel through the unshielded twisted pairs of wires defined as the links 20, 22 and 24. The distortions also result in part from the reflections from the links 20, 22 and 24 to the repeater 12 in FIG. 1.

The feed forward equalizer 102 may be considered to correct for distortions (or pre-cursor responses) in the portion 122 of the composite signal 120. The decision feedback equalizer 124 may be considered to correct for distortions (or post-cursor responses) in the portion 124 of the composite signal 120. As will be seen in FIG. 6, the distortions (or post-cursor response) in the portion 124 of the composite signal 120 result in a tail 126. This tail extends for a considerable period of time as indicated by the number of taps along the horizontal axis in FIG. 6. If corrections had to be provided for as many as fifty (50) taps to eliminate or significantly reduce the tail 126, this would unduly complicate the construction of the decision feedback equalizer 64 in FIG. 4.

To simplify the construction of the equalizer 64 in FIG. 4, the high pass filter 100 and the tail canceller 110 are included in the embodiment of the equalizer as shown in FIG. 5. The high pass filter 100 operates to block the passage of the low frequency signals which constitute a significant portion of the tail 126. As a result of the operation of the high pass filter 100, the length of the tail 126 is significantly reduced as indicated at 128 in FIG. 7. As will be seen schematically by a comparison of FIGS. 6 and 7, the number of taps is reduced from approximately fifty (50) in FIG. 6 to approximately (twenty) 20 in FIG. 7 because of the inclusion of the high pass filter 100 in FIG. 5.

Figure 8:
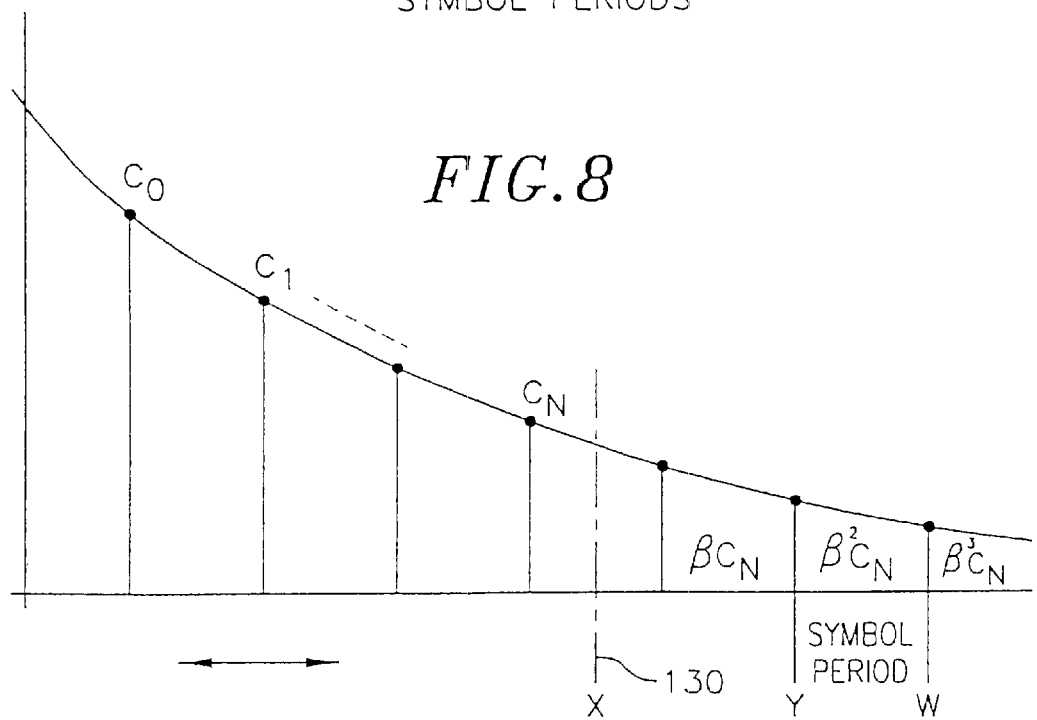
FIG. 8 is a curve similar to that shown in FIGS. 5 and 6 and illustrates the response of the system after an operation of a tail canceller included in the embodiment shown in FIG. 5 in limiting the length of the tail in the cable response shown in FIG. 6.

The tail canceller 110 reduces the number of taps required in the decision feedback equalizer. This may be seen from FIG. 8, which illustrates the tail on an enlarged schematic basis. As shown in FIG. 8, the tail decays substantially on an exponential basis from a position 130 which is the last tap of the decision feedback equalizer. This exponential decay is predictable. The tail canceller 110 accurately predicts the shape of this exponential decay and provides a cancellation of this exponential decay. The tail canceller 110 may constitute a first order recursive filter.

The output from the equalizer 64 in FIG. 4 is obtained from the quantizer 112 in FIG. 5. The quantizer 112 provides a plurality (e.g. 3) of progressive amplitude values and determines the particular one of the three (3) amplitude values closest to the output from the adder 104 for each of the digital signals produced by the converter 48. The quantizer 112 provides this output on a line 114 for each of the digital signals to indicate the data or information represented by such digital signals. In this way, the equalizer 64 in FIG. 4 restores the analog levels of the digital signals to the analog levels of these digital signals at the repeater 12 even with the distortions produced in these signals as they pass through the unshielded twisted pairs of wires defining the link such as the link 14.

The signals from the quantizer 112 in FIG. 5 are introduced to the timing recovery stage 66 in FIG. 4. The timing recovery stage provides a fine regulation of the time at which the analog-to-digital converter 42 produces the voltage $V_o$. As a first step in this regulation, the timing recovery stage 66 determines the amount of offset produced in the voltage $V_o$ as a result of the distortion produced in the unshielded twisted pairs of wires constituting the link such as the link 20.

Figure 12:
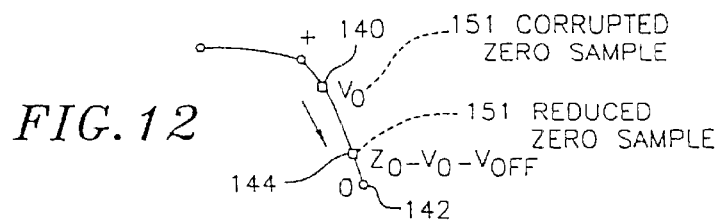
FIG. 12 illustrates the timing offset, made in the voltage assumed at the client to be at a zero crossing in the production of digital signals at the client, to compensate for the phase degradation produced during the passage of signals through the unshielded twisted pair of wires connected between the repeater and the client.

FIG. 12 illustrates the voltage $V_o$ at 140 and illustrates at 142 the "0" indication corresponding to the time at which the clock signal provided by the generator 68 crosses the zero axis. FIG. 12 also illustrates at 144 the shift in phase of the voltage $V_o$ as a result of the offset produced by the unshielded twisted pair of wires constituting the link such as the link 20. This voltage with the shifted phase is designated as $Z_o = V_o - V_{off}$ where $V_{off}$ is the offset voltage resulting from the phase distortion or degradation produced by the unshielded twisted pair of wires constituting the link such as the link 20.

Figure 13:
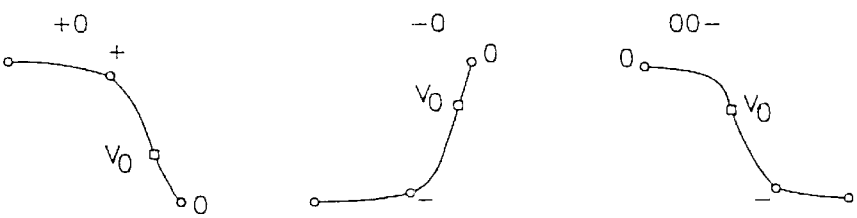
FIG. 13 provides timing relationships similar to those shown in FIG. 11 but including the effects of the offset shown in FIG. 12.
Figure 13:
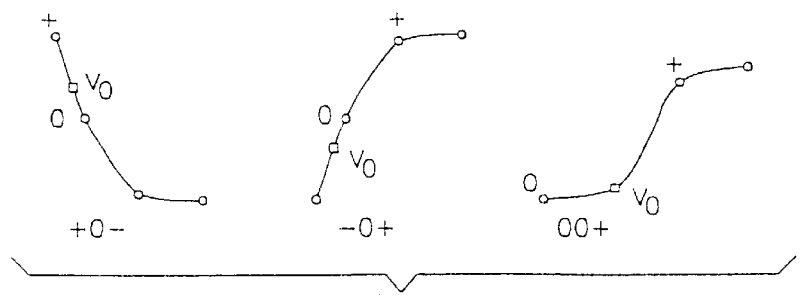

FIG. 13 provides a number of schematic representations similar to those shown in FIG. 11 and discussed above. However, many of the representations include a consideration of the offset voltage $V_o$ discussed in the previous paragraph and shown in FIG. 12. The first condition shown in FIG. 13 is designated as a "+0" transition. In this transition, $V_o - V_{off}$ has a value greater than 0. Furthermore, $V_o - V_{off}$ has a positive value as indicated by the "+" sign above and to the left of $V_o$. Under such circumstances, $V_o$ is shifted to the right—or, from a time standpoint, is delayed—so that $V_o - V_{off}$ will correspond in time to the zero crossing of the clock signals from the generator 68.

If $V_o - V_{off}$ should be negative with the same shape of curve as shown in the "+0" transition in FIG. 13, the $V_o - V_{off}$ indication would be below and to the right of the "0" indication. Under such circumstances, the time for the production of the digital signals by the converter 48 would be moved to the left—or, from a time standpoint, advanced—in FIG. 13 to have $V_o$ coincide in time with the "0" indication.

The second condition in FIG. 13 is designated as a "−0" transition. In this transition, $V_o + V_{off}$ is less than 0. $V_{off}$ is added to $V_o$ in this transition because $V_o$ is negative and the delay represented by $V_{off}$ advances $V_o$ toward a value of 0. In this transition, the "0" indication is above and to the right of the $V_o$ indication. This is indicated by a "−" sign below and to the left of the $V_o$ indication. Under such circumstances, the timing of the $V_o$ indication would be moved to the right—or, from a time standpoint, delayed—in FIG. 13 to have $V_o$ coincide in time with the "0" indication.

If $V_o + V_{off}$ should be greater than 0 with the same shape of curve as shown in the "−0" transition in FIG. 13, the $V_o + V_{off}$ voltage would be above and to the right of the "0" indication in FIG. 13. Under such circumstances, the $V_o$ would be moved to the left—or, from a time standpoint, advanced—in FIG. 13 to have $V_o+V_{off}$ coincide in time with the "0" indication.

The third condition in FIG. 13 is designated as a "+0–" transition. In this transition, $V_o-V_{off}$ is greater than 0. Furthermore, the transition is from a + value to a value of 0 and then to a – value. (This is why it is designated as "+0–".) Under such circumstances, $V_o$ is moved to the right—or, from a time standpoint, delayed—in FIG. 13 to have $V_o$ coincide in time with the "0" indication.

If $V_o-V_{off}$ should be less than 0 with the same shape of curve as shown in the "+0–" transition in FIG. 13, the $V_o-V_{off}$ indication would be below and to the right of the "0" indication. Under such circumstances, the $V_o$ indication would be moved to the left—or, from a time standpoint, advanced—to have $V_o$ coincide in time with the "0" indication.

The fourth condition in FIG. 13 is designated as a "–0+" transition. In this transition, $V_o+V_{off}$ is less than 0. $V_{off}$ is added to $V_o$ in this transition because $V_o$ is negative and the delay represented by $V_{off}$ advances $V_o$ toward a value of 0. Furthermore, the transition is from a – value to a value of 0 and then to a + value. (This is why it is designated as "–0+".) Under such circumstances, $V_o$ is moved to the right—or, from a time standpoint, delayed—to have $V_o$ coincide in time with the "0" indication.

If $V_o+V_{off}$ should be greater than 0 with the same shape of curve as shown in the "–0+" transition in FIG. 13, the $V_o+V_{off}$ indication would be above and to the right of the "0" indication. Under such circumstances, the $V_o$ indication would be moved to the left—or, from a time standpoint, advanced—to have $V_o$ coincide in time with the "0" indication.

The fifth (5th) condition in FIG. 13 is designated as a "00–" transition. (This results from the fact that the first two (2) positions in this transition have values of 0 or values close to 0 and the third position in this transition is negative). The voltage $V_o$ is between the two (2) zero (0) indications and has a value greater than the two (2) zero (0) indications. Under such circumstances, the $V_o$ voltage is moved to the right—or, from a time standpoint, is delayed—to have the $V_o$ voltage correspond in time with the second of the two zero (0) indications.

If $V_o$ should be less than the two 0 indications with the same shape of curve as shown in the "00–" transition in FIG. 13, the $V_o$ voltage should be below and to the right of the second of the two zero (0) indications. Under such circumstances, the $V_o$ voltage is moved to the left—or, from a time standpoint, advanced—in FIG. 13 to have the $V_o$ voltage correspond in time with the second of the two zero (0) indications.

The sixth condition in FIG. 13 is designated as a "00+" transition. (This results from the fact that the first two (2) positions in this transition have values of 0 or values close to 0 and the third position in this transition is positive.) The voltage $V_o$ is between the two zero (0) indications and has a value less than the two zero (0) indications. Under such circumstances, the $V_o$ voltage is moved to the right—or, from a time standpoint, delayed—to have the $V_o$ voltage correspond in time with the second of the two zero (0) indications.

If $V_o$ should be greater than the two zero (0) indications, with the same shape of curve as shown in the "00+" transition in FIG. 13, the $V_o$ voltage would be above and to the right of the second of the two zero (0) indications. Under such circumstances, the $V_o$ voltage is moved to the left—or, from a time standpoint, advanced—to have the $V_o$ voltage correspond in time with the second of the two zero (0) conditions.

The system and method of this invention have certain important advantages. They provide a conversion of the received analog signals to digital signals. They provide for a processing of the digital signals by the timing recovery stage 66 to have the digital conversions occur at the zero crossings of a reference clock signal generated by the generator 68. In this way, the analog signals can be sampled digitally at the times at which the amplitudes of the analog signals represent individual ones of analog levels +1, 0 and –1. This processing of the digital signals by the timing recovery stage 66 initially provides a coarse regulation of the time for the digital conversions by the converter 48.

Subsequently the equalizer 64 operates upon the digital signals from the converter 48 to determine whether the amplitudes of the digital signals have analog values of +1, 0 or –1. The operation of the equalizer 64 to determine the amplitudes of the digital signal is facilitated by the inclusion of the high pass filter 100 and the canceller 112 to limit the length of the tail in the digital signals. The timing recovery stage 66 then provides fine regulation of the signals from the equalizer 64 to have the digital processing by the converter 48 occur at the zero crossings of the clock signals from the clock signal generator 68.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. In combination for operating upon digital signals provided at a particular frequency, which digital signals have been scrambled and encoded and then converted to analog signals, to recover the information represented by such digital signals, first means for providing clock signals at the particular frequency, second means for converting the analog signals to digital signals at the particular frequency, the digital signals having a pre-cursor response and a post-cursor response, a feed forward equalizer for producing signals inhibiting the pre-cursor response, a decision feedback equalizer for producing signals inhibiting the post-cursor response, an adder for combining the signals from the feed forward equalizer and the decision feedback equalizer to provide resultant signals, a high pass filter for producing signals limiting the time duration or tail of the post-cursor response before the introduction of the digital signals to the feed forward equalizer whereby the high pass filter reduces the length of the tail and accordingly the number of taps associated with the feed forward equalizer, and a tail canceller responding to the digital signal from the feed forward equalizer for producing signals further limiting the time duration of the post-cursor response in the digital signals, whereby the tail canceller reduces the number of taps required in the decision feedback equalizer.

2. In a combination as set forth in claim 1, the adder constituting a first adder, a second adder responsive to the output signals from the decision feedback equalizer and the tail canceller for producing signals for introduction to the first adder for combination with the signals from the feed forward equalizer to produce the resultant signals.

3. In a combination as set forth in claim 1, a quantizer responsive to the resultant signals from the adder for providing digital signals representing values of +1, 0 and −1 in accordance with the amplitudes of the resultant signals from the first adder.

4. In a combination as set forth in claim 3, the adder constituting a first adder, a second adder responsive to the output signals from the decision feedback equalizer and the tail canceller for producing signals for introduction to the first adder for combination with the signals from the feed forward equalizer to produce the resultant signals, and means for introducing the signals from the quantizer to the decision feedback equalizer for the production by the decision feedback equalizer of the digital signals inhibiting the post-cursor response.

5. In combination for use in a system providing first signals having individual ones of a plurality of analog levels to represent information, a repeater, a plurality of clients, pairs of unshielded twisted wires, each pair being disposed between the repeater and an individual one of the clients to transmit the first signals between the repeater and the individual one of the clients, first means in each of the clients for receiving the first signals from the repeater, second means for providing clock signals at a particular frequency, third means for converting the first signals to digital signals, the digital signals having a pre-cursor response and a post-cursor response, the post-cursor response having a tail of a certain length, a high pass filter for reducing the length of the tail, a feed-forward equalizer at each of the clients for providing an output inhibiting the pre-cursor response in the digital signals from the third means at such client, whereby the number of taps in the equalizer is reduced via use of the high pass filter, a decision feedback equalizer at each of the clients for providing an output inhibiting the post-cursor response in the digital signals from the third means at such client, a tail canceller at each of the clients for providing an output limiting the duration of the post-cursor response of the digital signals at such client, whereby the number of taps in the decision feedback equalizer is reduced via use of the high pass filter and tail canceller, a first adder at each of the clients for combining the outputs from the feed forward equalizer and the tail canceller to obtain first resultant signals at such client, and a second adder at each of the clients for combining the output from the feed forward equalizer and the first resultant signals from the first adder to produce second resultant signals indicative of the information represented by the first signals.

6. In a combination as set forth in claim 5, a quantizer responsive at each of the clients to the second resultant signals from the second adder at such client for selecting for each of the second resultant signals a magnitude indicative of an individual one of a plurality of amplitudes closest in magnitude to each of the second resultant signals, and means responsive to the magnitudes selected by the quantizer for each of the digital signals for introducing such magnitudes as the digital signals to the decision feedback equalizer.

7. In a combination as set forth in claim 6, a high pass filter at each of the clients for receiving the digital signals from the third means at such client and for passing the high frequency components of such digital signals to the feed forward equalizer as inputs to the feed forward equalizer at such client.

8. An apparatus for operating upon and recovering certain information represented by digital signals, the digital signals having been scrambled and encoded and converted to analog signals and provided at a particular frequency, the apparatus comprising:

first means for providing clock signals at the particular frequency;

second means for converting the analog signals to digital signals at the particular frequency, the digital signals having a pre-cursor response and a post-cursor response;

a feed forward equalizer for producing signals inhibiting the pre-cursor response;

a decision feedback equalizer for producing signals inhibiting the post-cursor response;

an adder for combining the signals from the feed forward equalizer and the decision feedback equalizer to provide resultant signals;

a high pass filter for producing signals limiting the time duration or tail of the post-cursor response before the introduction of the digital signals to the feed forward equalizer, whereby the number of taps is reduced via inclusion of the high pass filter; and a tail canceller response to the digital signal from the feed forward equalizer for producing signals further limiting the time duration of the post-cursor response in the digital signals, whereby the tail canceller predicts the shape of tail decay and provides a cancellation of this decay.

9. The apparatus of claim 8, wherein the tail canceller predicts the shape of exponential tail decay and provides a cancellation of this exponential decay.

10. The apparatus of claim 8, wherein the number of taps is reduced by at least one-half via inclusion of the high pass filter.

11. An apparatus for operating upon and recovering certain information represented by digital signals, the digital signals having been scrambled and encoded and converted to analog signals and provided at a particular frequency, the apparatus comprising:

first means for providing clock signals at the particular frequency;

second means for converting the analog signals to digital signals at the particular frequency, the digital signals having a pre-cursor response and a post-cursor response;

a feed forward equalizer for producing signals inhibiting the pre-cursor response;

a decision feedback equalizer for producing signals inhibiting the post-cursor response;

a means for providing phase adjustments to the pre-cursor and post-cursor responses, by determining the polarity, and the polarity of any change, at times corresponding to the zero crossings;

an adder for combining the signals from the feed forward equalizer and the decision feedback equalizer to provide resultant signals;

a high pass filter for producing signals limiting the time duration or tail of the post-cursor response before the introduction of the digital signals to the feed forward equalizer, whereby the number of taps is reduced via inclusion of the high pass filter; and a tail canceller response to the digital signal from the feed forward equalizer for producing signals further limiting the time duration of the post-cursor response in the digital signals, whereby the tail canceller predicts the shape of tail decay and provides a cancellation of this decay.

12. The apparatus of claim 11, wherein a phase offset is provided, before phase adjustments are made, to compensate for phase degradations produced in pre-cursor and post-cursor responses.

* * * * *